United States Patent
Lemmouchi et al.

(10) Patent No.: US 10,798,966 B2
(45) Date of Patent: Oct. 13, 2020

(54) FILTER MATERIALS AND FILTERS MADE THEREFROM

(71) Applicant: British American Tobacco (Investments) Limited, London (GB)

(72) Inventors: Yahia Lemmouchi, London (GB); Andrew Davis, London (GB); Barry Dimmick, London (GB); Martin Dauner, Denkendorf (DE); Christoph Rieger, Denkendorf (DE); Andreas Ullrich, Denkendorf (DE)

(73) Assignee: BRITISH AMERICAN TOBACCO (INVESTMENTS) LIMITED, London (GB)

(*) Notice: Subject to any disclaimer, the term of this patent is extended or adjusted under 35 U.S.C. 154(b) by 345 days.

(21) Appl. No.: 15/113,433

(22) PCT Filed: Jan. 21, 2015

(86) PCT No.: PCT/GB2015/050127
§ 371 (c)(1),
(2) Date: Jul. 21, 2016

(87) PCT Pub. No.: WO2015/110803
PCT Pub. Date: Jul. 30, 2015

(65) Prior Publication Data
US 2017/0020186 A1    Jan. 26, 2017

(30) Foreign Application Priority Data

Jan. 21, 2014  (GB) .................................. 1400990.6

(51) Int. Cl.
*A24D 3/00*    (2006.01)
*B01D 39/18*   (2006.01)
(Continued)

(52) U.S. Cl.
CPC ............... *A24D 3/063* (2013.01); *A24D 3/04* (2013.01); *A24D 3/068* (2013.01); *A24D 3/10* (2013.01);
(Continued)

(58) Field of Classification Search
None
See application file for complete search history.

(56) References Cited

U.S. PATENT DOCUMENTS 2,765,515 A * 10/1956 Knudson .................. A24D 3/04
                                                        131/341
3,039,908 A *  6/1962 Parmele ............... A24D 3/0233
                                                        131/341
(Continued)

FOREIGN PATENT DOCUMENTS

CA    2838917 A1   12/2012
CN    1603036 A    4/2005
(Continued)

OTHER PUBLICATIONS

Office Action for Japanese Patent Application No. 2016-563274; dated May 23, 2017.
(Continued)

*Primary Examiner* — Linda L Gray
(74) *Attorney, Agent, or Firm* — Cantor Colburn LLP (57) ABSTRACT

The present invention relates to filter material for inclusion in a smoking article, said filter material comprising a base material comprising or made from fibers having a first diameter or mean diameter, and fine fibers having a diameter or mean diameter which is smaller than the first diameter, wherein the filter material comprises more than 10% by weight and/or by volume fine fibers or wherein the diameter or mean diameter of the fine fibers is between about 1.0 μm and about 1.5 μm. The invention also relates to filters or filter (Continued)

elements comprising the filter material, smoking articles comprising the same, and use of the filter material in smoke filtration.

14 Claims, 5 Drawing Sheets

(51) Int. Cl.
  *A24D 3/06* (2006.01)
  *A24D 3/04* (2006.01)
  *A24D 3/10* (2006.01)
  *A24D 3/02* (2006.01)
(52) U.S. Cl.
  CPC ............ *A24D 3/027* (2013.01); *A24D 3/0275* (2013.01); *B01D 39/18* (2013.01)

(56) References Cited

U.S. PATENT DOCUMENTS

| | | | | |
|---|---|---|---|---|
| 3,297,041 A | * | 1/1967 | Sproull | A24D 3/14 |
| | | | | 131/342 |
| 3,451,887 A | * | 6/1969 | Touey | A24D 3/08 |
| | | | | 131/341 |
| 3,882,877 A | | 5/1975 | Brackmann | |
| 4,059,121 A | | 11/1977 | Brackmann | |
| 5,554,287 A | * | 9/1996 | Beck | B01D 39/18 |
| | | | | 210/500.29 |
| 5,856,006 A | * | 1/1999 | Asai | A24D 3/065 |
| | | | | 131/332 |
| 2006/0264130 A1 | | 11/2006 | Karles | |
| 2007/0275458 A1 | | 11/2007 | Gouma | |
| 2011/0083686 A1 | | 4/2011 | Yang | |
| 2013/0074853 A1 | | 3/2013 | Sebastian | |
| 2014/0026909 A1 | * | 1/2014 | Sebastian | A24D 3/063 |
| | | | | 131/332 |

FOREIGN PATENT DOCUMENTS

| | | |
|---|---|---|
| CN | 101538775 A | 9/2009 |
| CN | 101724934 A | 6/2010 |
| DE | 2806030 A1 | 8/1979 |
| EP | 0364256 A1 | 4/1990 |
| EP | 0711512 A2 | 5/1996 |
| GB | 757283 | 9/1954 |
| GB | 773701 | 3/1955 |
| GB | 810486 | 12/1955 |
| GB | 1042547 | 8/1965 |
| GB | 1199165 | 9/1967 |
| GB | 2020536 A | 11/1979 |
| JP | 11057343 A | 3/1999 |
| JP | 2007236343 A | 9/2007 |
| KR | 20050077304 A | 8/2005 |
| KR | 20080075627 A | 8/2008 |
| KR | 20100090565 A | 8/2010 |
| KR | 20110032510 A | 3/2011 |
| TW | 201016921 A | 5/2010 |
| WO | 9516369 A1 | 6/1995 |
| WO | 2004080217 A1 | 9/2004 |
| WO | 2005009150 A2 | 2/2005 |
| WO | 2007048359 A1 | 5/2007 |
| WO | 2009016513 A2 | 2/2009 |

OTHER PUBLICATIONS

Examination Report for corresponding application AU2015208909 filed Jan. 21, 2014; Report dated Feb. 21, 2017.
International Preliminary Report on Patentability for corresponding application PCT/GB2015/050127 filed Jan. 21, 2015; Report dated May 30, 2016.
International Search Report for corresponding application PCT/GB2015/050127 filed Jan. 21, 2015; Report dated Apr. 22, 2015.
Written Opinion for corresponding application PCT/GB2015/050127 filed Jan. 21, 2015; Report dated Apr. 22, 2015.

* cited by examiner

FILTER MATERIALS AND FILTERS MADE THEREFROM

FIELD

The present invention relates to filter materials for use in smoking articles. The invention also relates to filters or filter elements comprising the filter materials, smoking articles comprising the same, and use of the filter materials in smoke filtration.

BACKGROUND

A wide variety of fibrous materials have been suggested as filters for cigarette smoke. Cellulose acetate tow is the most commonly used filter material. However, this filter material can be relatively costly to manufacture and/or slow to degrade.

SUMMARY

According to a first aspect of the present invention, a filter material for inclusion in a smoking article is provided, said filter material comprising a base material comprising or made from fibres having a first diameter or mean diameter, and fine fibres having a diameter or mean diameter which is smaller than the first diameter, wherein the filter material comprises more than 10% by weight and/or by volume fine fibres.

According to a second aspect, a filter material for inclusion in a smoking article is provided, said filter material comprising a base material comprising or made from fibres having a first diameter or mean diameter, and fine fibres having a diameter or mean diameter which is smaller than the fibres of the base material, wherein the diameter or mean diameter of the fine fibres is between about 1.0 µm and about 1.5 µm.

In some embodiments of the aspects of the invention, the fine fibres comprise cellulose acetate and/or derivatives thereof, polylactic acid (PLA), polybutylene succinate (PBS), polyvinyl alcohol (PVOH), polybutylene adipate terephthalate (PBAT) or polyglycolic acid (PGA), chitosan, polyhydroxybutyrate (PHB), polyethylene oxide (PEO), gelatine, or any combination thereof.

In some embodiments, the fine fibres consist essentially of cellulose acetate and/or derivatives thereof.

In some embodiments, the fine fibres are produced by centrifuge spinning or by dry spinning.

In some embodiments, the base material consists essentially of a biodegradable material.

In some embodiments, the base material comprises or consists essentially of polylactic acid, polyvinyl alcohol, cellulose, cellulose acetate, or any combination thereof.

In some embodiments, the base material comprises or consists essentially of cellulose acetate.

In some embodiments, the base material is in the form of tow.

In some embodiments, the base material is in the form of a non-woven web.

In some embodiments, the fine fibres are on the surface of the base material.

According to a third aspect, filters and filter elements are provided, comprising the filter material according to the first or second aspects.

According to a fourth aspect, smoking articles are provided, comprising the filter or filter elements according to the third aspect.

According to a fifth aspect, use of the filter material of the first or second aspects in the filtration of tobacco smoke is provided.

BRIEF DESCRIPTION OF THE FIGURES

In order that aspects of the invention may be more fully understood, embodiments thereof are described, by way of illustrative example, with reference to the accompanying drawings in which.

DETAILED DESCRIPTION

The present invention relates to a filter material, the filter material comprising fine fibres. As used herein, the term "fine fibre" includes fibres with a diameter of up to about 10 µm, or having a diameter of between about 0.5 µm and about 10 µm. In some embodiments, fine fibres are fibres with a diameter of between about 0.7 µm and about 1.5 µm, optionally with a diameter of between about 0.85 µm and about 1.4 µm, between about 1.0 µm and about 1.5 µm and/or between about 1.0 µm and about 1.3 µm. In other embodiments, fine fibres are fibres having a diameter of between about 3 µm and about 5 µm, or of between about 1.5 µm and about 3 µm. In yet further embodiments, the fine fibres are fibres having a diameter of between about 7 µm and about 10 µm.

In some embodiments, including, for instance, where the fine fibres have a diameter of no more than 1.5 µm, the filter material may comprise at least about 1%, at least about 2%, at least about 3%, at least about 4%, at least about 5%, at least about 6%, at least about 7%, at least about 8%, at least about 9%, at least about 10%, at least about 11%, at least about 12%, at least about 13%, at least about 14%, at least about 15%, at least about 16%, at least about 17%, at least about 18%, at least about 19%, at least about 20%, at least about 25%, at least about 30%, at least about 35%, at least about 40%, at least about 45%, or at least about 50% by weight fine fibres.

Alternatively or in addition, the filter material may comprise more than about 1%, more than about 2%, more than about 3%, more than about 4%, more than about 5%, more than about 6%, more than about 7%, more than about 8%, more than about 9%, more than about 10%, more than about 11%, more than about 12%, more than about 13%, more than about 14%, more than about 15% and/or more than about 16% by weight fine fibres, for example, where the fine fibres have a diameter of no more than 1.5 µm.

Alternatively or in addition, the filter material may comprise less than about 100%, less than about 95%, less than about 90%, less than about 85%, less than about 80%, less than about 75%, less than about 70%, less than about 65%, less than about 60%, less than about 55% and/or less than about 50% by weight fine fibres.

In some embodiments where the fine fibres have a diameter of between about 3 μm and about 10 μm, the filter material may comprise up to 100% fine fibres. In some of these embodiments, the fine fibres may have a diameter of between about 3 μm and about 5 μm, of between about 5 μm and about 7 μm, or the fine fibres may have a diameter of between about 7 μm and about to μm.

In some embodiments where the fine fibres have a diameter of less than about 1.5 μm, the filter material may comprise up to about 30% or up to about 40% by weight fine fibres, and at least about 1% by weight.

The fine fibres may have a high surface area to volume ratio. The fine fibres may have an extremely high surface area to volume ratio.

The fine fibres may have any suitable cross-sectional shape. In some embodiments, the fine fibres may have a circular or substantially circular cross-section. In some embodiments, the fine fibres may have a trilobal, pentalobal or elongated cross-sectional shape, or any other shape which increases the surface to cross-sectional area ratio.

In some embodiments, the filter material may comprise at least about 1%, at least about 2%, at least about 3%, at least about 4%, at least about 5%, at least about 6%, at least about 7%, at least about 8%, at least about 9%, at least about 10%, at least about 11%, at least about 12%, at least about 13%, at least about 14%, at least about 15%, at least about 16%, at least about 17%, at least about 18%, at least about 19%, at least about 20%, at least about 25%, at least about 30%, at least about 35%, at least about 40%, at least about 45% or at least about 50% by volume fine fibres.

Alternatively or in addition, the filter material may comprise less than about 100%, less than about 95%, less than about 90%, less than about 85%, less than about 80%, less than about 75%, less than about 70%, less than about 65%, less than about 60%, less than about 55% and/or less than about 50% by volume fine fibres.

In some embodiments, the filter material may comprise at least about 15%, at least about 20%, at least about 25%, at least about 30%, at least about 40%, at least about 45%, at least about 50%, at least about 55%, at least about 60%, at least about 65%, at least about 70%, at least about 75%, at least about 80%, at least about 85%, at least about 90% or at least about 95% by surface area fine fibres.

Alternatively or in addition, the filter material may comprise less than about 100%, less than about 95%, less than about 90%, less than about 85%, less than about 80%, less than about 75%, less than about 70%, less than about 65%, less than about 60%, less than about 55% or less than about 50% by surface area fine fibres.

The filter material may have an acceptable and/or desirable filtration efficiency. The filter material may have an acceptable and/or desirable filtration efficiency for the filtration of gaseous material, such as tobacco smoke. In some embodiments, an acceptable filtration efficiency for the filtration of tobacco smoke may be the removal of at least about 15%, at least about 20%, at least about 25%, at least about 30%, at least about 35%, at least about 40%, at least about 45%, or at least about 50% nicotine-free dry particulate matter (NFDPM). In some embodiments, an acceptable filtration efficiency for the filtration of tobacco smoke may be the removal of at least about 15%, at least about 20%, at least about 25%, at least about 30%, at least about 35%, at least about 40%, at least about 45%, or at least about 50% nicotine.

The filter material may have an acceptable and/or desirable pressure drop. The fine fibres may provide an acceptable and/or desirable pressure drop when the filter material is in use, for example when it has been incorporated into a smoking article. In some embodiments, filter material comprising more than 10% by weight fine fibres may have an acceptable and/or desirable pressure drop. In some embodiments, an acceptable and/or desirable pressure drop may be between about 60 and about 140 mmWG, between about 80 and about 140 mmWG, between about 100 and about 140 mmWG, between about 110 and about 140 mmWG, between about 120 and about 140 mmWG, or between about 120 and about 135 mmWG.

In some embodiments, the diameter of the fine fibres contributes to and/or results in an acceptable and/or desirable pressure drop when the filter material is incorporated into a smoking article. In some embodiments, filter material comprising fine fibres with a diameter of between about 0.7 μm and about 1.5 μm, optionally between about 1.0 μm and about 1.5 μm, may have an acceptable and/or desirable pressure drop.

In some embodiments, the filter material has an acceptable and/or desirable filtration efficiency and an acceptable and/or desirable pressure drop when in use, for example when the filter material is incorporated into a smoking article.

In some embodiments, the fine fibres may have a sufficiently large diameter so that they do not dissolve when in use, for example when filtering tobacco smoke.

In some embodiments, the fine fibres may comprise cellulose acetate and/or derivatives thereof, polylactic acid (PLA), polybutylene succinate (PBS), polyvinyl alcohol (PVOH), polybutylene adipate terephthalate (PBAT), polyglycolic acid (PGA), chitosan, polyhydroxybutyrate (PHB), polyethylene oxide (PEO), gelatine, or any combination thereof.

In some embodiments, the fine fibres may consist essentially of, or may consist of cellulose acetate and/or derivatives thereof.

In some embodiments, the fine fibres may comprise between about 50% and about 100% cellulose acetate. The fine fibres of the filter material may comprise about 20%, about 25%, about 30%, about 35%, about 40%, about 45%, about 50%, about 55%, about 60%, about 65%, about 70%, about 75%, about 80%, about 85%, about 90%, about 95%, about 99% or about 100% cellulose acetate. In some embodiments, the fine fibres of the filter material consist of 100% cellulose acetate.

In some embodiments, the inclusion of cellulose acetate in the fine fibres may be advantageous as cellulose acetate is known to contribute to the selective removal of semi-volatile compounds and/or phenolic compounds. Furthermore, cellulose acetate is a known filter material and so the taste of the smoke will be generally consistent with that produced by cigarettes with conventional cellulose acetate filters when filter material including cellulose acetate fine fibres is used for the filtration of tobacco smoke.

The fine fibres may be produced by any method known in the art. In some embodiments, the fine fibres are produced by centrifuge spinning. Centrifuge spinning is a known technology, in which a high performance centrifuge is installed in a spraying chamber. In some embodiments, fine fibres produced by the centrifuge cover and/or coat a substrate that is placed in the spraying chamber. In some embodiments, the centrifuge spinning technology has a higher productivity than other processes using electrostatic processing.

In some embodiments, the fine fibres are prepared by a dry spinning method as described in patent DE 2806030 (Deutsche Institute fuer Textil-und Faserforschung Stuttgart). In dry spinning a polymer solution is spun into a gaseous environment where the solvent is evaporated and the polymer is forming fibres due to external forces like gravity, mechanical drawing or air drag, the latter being used in DE 2806030. A high speed air stream takes the polymer solution directly at the nozzle tip, evaporates the solvent and draws the fibres. Finally the fibres are collected on a rod or a forming web.

In some embodiments, the fine fibres are not prepared by electrostatic spinning (electrospinning) or by electrostatic spraying (electrospraying).

The fine fibres may be in any suitable shape or conformation. For example, the fine fibres may be in the form of a thread, a floc, a tow (filter bundle), a web and/or a sheet. The fine fibres may be in non-woven or woven form. In some embodiments, the fine fibres are in non-woven web form. Non-woven fabrics, sheets and the like are referred to herein as non-woven webs.

In embodiments in which the fine fibres are in the form of a web (i.e. a light, non-woven material), the web may have a density of at least 1 gsm, optionally at least 2 gsm. In some embodiments in which the fine fibres are in the form of a web, the web may have a density of between about 1 gsm and 20 gsm, optionally between about 3 gsm and 15 gsm.

The fine fibres may be of any suitable length. In some embodiments, the fine fibres may be referred to as being "endless" or continuous (meaning that the fibres are long and their length may be difficult to readily determine, especially, for example, in a non-woven format). In some embodiments, each fine fibre may have a length that is at least 1000 times the diameter of the fine fibre. In some embodiments in which the filter material is placed in a filter or filter element of a smoking article, the length of the fine fibres may be at least as long as the width and/or length of the filter or filter element.

In some embodiments, the fine fibres may be sufficiently strong to withstand pressures exerted on the fine fibres during use. For example, in embodiments in which the filter material is incorporated into a smoking article, the fine fibres may be sufficiently strong to withstand pressures exerted on the filter material on smoking. In some embodiments in which the filter material is incorporated into a smoking article, the fine fibres are sufficiently strong so that they do not snap during smoking.

The filter material may also include a base material. This may comprise or be formed from fibres with a diameter or mean diameter greater than the fine fibres. The base material may comprise or be formed from fibres with a diameter or mean diameter of between about 10 μm and about 50 μm, optionally between about 10 μm and about 30 μm. In some embodiments, the base material comprises fibres with a diameter or mean diameter of about 20 μm.

A filter material comprising fine fibres and a base material comprising or made from fibres with a greater diameter or mean diameter than the fine fibres may be advantageous for maintaining large pores to achieve a low pressure drop and/or a stable filter material when the filter material is incorporated into a smoking article.

In some embodiments, the base material and the fine fibres consist essentially of or consist of the same material. For example, the base material and the fine fibres may comprise, consist essentially of, or consist of cellulose acetate and/or derivatives thereof.

Alternatively, the material of the base material may be different from the material of the fine fibres. The combination of the smaller and larger diameter fibres of different materials may give the filter material desirable properties. Such desirable properties may include strength, good processability, efficient filtration, affordability, biodegradability and/or sustainability.

In some embodiments in which the fine fibres consist essentially of or consist of cellulose acetate, the base material comprises, consists essentially of, or consists of a material other than cellulose acetate. The inclusion of base material that is made from a material other than cellulose acetate may make the filter material more affordable to manufacture.

The base material may advantageously comprise a relatively cheap, degradable and/or sustainable material, which has the effect that the filter material is more cost effective, degrades quicker and/or is more sustainable than conventional filter material, whilst also having good adsorption characteristics.

In some embodiments, the base material consists essentially of or consists of a biodegradable material. In some embodiments, the base material comprises, consists essentially of, or consists of polylactide (PLA), polyvinyl alcohol (PVOH) and/or cellulose.

Alternatively or in addition, the base material may comprise, consist essentially of, or consist of cellulose acetate fibres. The cellulose acetate fibres may have been produced by dry spinning.

The base material may be in any suitable conformation. For example, the base material may be in the form of a filament, a floc, a tow (filter bundle), a web and/or a sheet structure. The base material may be in non-woven or woven form.

In some embodiments, the base material may be in the form of paper, optionally in the form of from about 20 to about 50 gsm paper, or from about 30 to about 35 gsm paper.

In some embodiments, the fine fibres and the base material are in close proximity. For example, the fine fibres may be arranged on the surface of and/or within the base material structure. In some alternative embodiments, the fine fibres and the base material are physically separate and/or not interlinked or intertwined.

In some embodiments, the base material is in non-woven web form, optionally in paper form. This may offer advantages during the manufacture of the filter material, for example by allowing the application of the fine fibres to the surface of the web as part of the manufacturing process of the filter material. Furthermore, the resulting filter material may have advantageous or desirable properties, such as increased degradability in comparison with conventional filter material.

The base material may be produced by any method known in the art and/or may be available commercially.

The filter material may include one or more additives. In some embodiments, the one or more additives may affect the adsorption characteristics of the filter material. For example, the one or more additives may improve filtration selectivity, to phenols for instance.

In some embodiments, the one or more additives may affect the physical properties of the filter material. For example, the one or more additives may improve filter hardness, depending on the percentage weight of fine fibres in the filter material.

In some embodiments, the one or more additives may be triacetin (TA), polyethylene glycol (PEG) and/or triethyl citrate (TEC).

In an embodiment, the filter material comprises fine fibres with a diameter or mean diameter of about 1 μm, a base material comprising or formed of cellulose or PVOH fibres, and an additive such as triacetin. The resulting filter material may be biodegradable or partially biodegradable.

The filter material may be incorporated into a filter or filter element.

The skilled person will be aware of a suitable filter structure. In some embodiments, the filter has one section or compartment. The filter may be a mono filter. Alternatively, the filter may comprise a plurality of sections, filter elements or compartments. The filter may be a dual filter.

In some embodiments in which the fine fibres and the base material are physically separate, one population of fibres is in one section or area of the filter and the other population of fibres is in another section or area of the filter.

In some embodiments, the fine fibres are positioned adjacent to the base material. In some embodiments, the fine fibres may be positioned between at least two segments of base material. In some embodiments, the fine fibres are surrounded by the base material, for example in embodiments in which the fine fibres are in the form of a thread.

In some embodiments, the fine fibres are in the form of a disc, which is inserted into the filter. The disc may have substantially the same circumference as the filter, so that when the disc is placed in the filter it will cover the entire area of the filter when seen in transverse cross-section. This arrangement offers the advantage that all of the substances flowing through the filter will or are likely to encounter the disc. In some embodiments, the disc also comprises the base material. Alternatively or in addition, the base material may be separate from the disc.

In some embodiments, the fine fibres are in the form of a web material that is rolled up, to give a spiral-like conformation when viewed in transverse cross-section, which is inserted into the filter. In some embodiments, the web material also comprises the base material. Alternatively or in addition, the base material may be separate from the web material. In some embodiments, the web material is formed into a filter or filter element using machinery currently used for non-woven web or sheet filter manufacture.

Filter rods may be manufactured to a target length of 144 mm and a target circumference of 24.3 mm, using a paper filter machine (KDF2-Decoufle CU20). When incorporated into a filter or filter element, the filter material may confer desirable physical properties. For example, pressure drop across the filter or filter element may be between 60 and 140 mmWG, which would be a desirable pressure drop when the filter or filter element is incorporated into a smoking article.

In some embodiments, the filter or filter element may have a weight of between about 120 and about 250 mg.

The filter material may be incorporated into a smoking article, or a part thereof. In some embodiments, a filter or filter element containing the filter material is incorporated into a smoking article. The filter material, filter or filter element may be incorporated into a smoking article by any method known in the art.

As used herein, the term "smoking article" includes smokeable products such as cigarettes, cigars and cigarillos whether based on tobacco, tobacco derivatives, expanded tobacco, reconstituted tobacco or tobacco substitutes and also heat-not-burn products. In addition, in some embodiments, the term "smoking article", as used herein, further encompasses aerosol generation devices, such as e-cigarettes and other nicotine inhalers, as well as inhalation devices such as so-called "heat-not-burn" devices in which tobacco is heated but not combusted.

Figure 1:
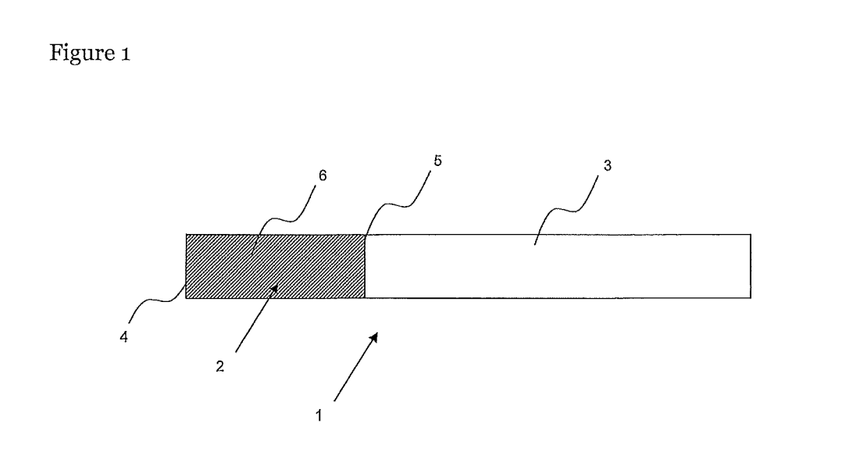
FIG. 1 is a schematic side view of a smoking article including a filter according to some embodiments.

Referring to FIG. 1, a smoking article 1 according to an embodiment of the invention comprises a filter 2 and a cylindrical rod of smokeable material 3, such as tobacco, aligned with the filter 2 such that one end of the smokeable material rod 3 abuts the end of the filter 2. The filter 2 is wrapped in a plug wrap (not shown) and the smokeable material rod 3 is joined to the filter 2 by tipping paper in a conventional manner. The filter 2 is substantially cylindrical and has a mouth end 4 and a smokeable material end 5. The filter 2 comprises filter material 6 as described herein.

Figure 2:
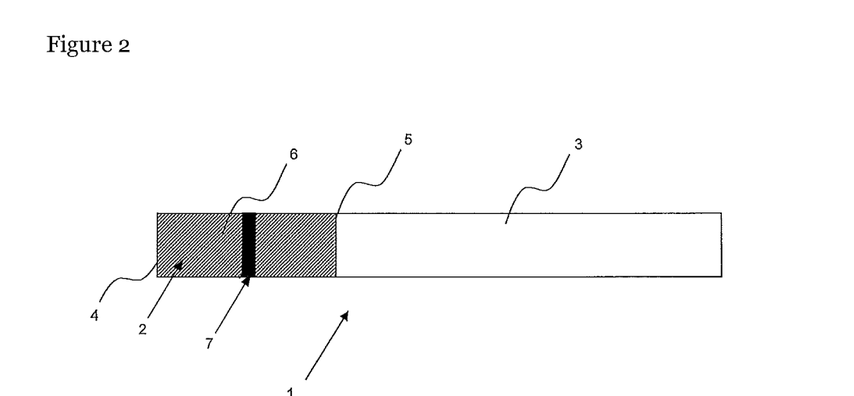
FIG. 2 is a schematic side view of a smoking article including a filter according to some embodiments.
Figure 3:
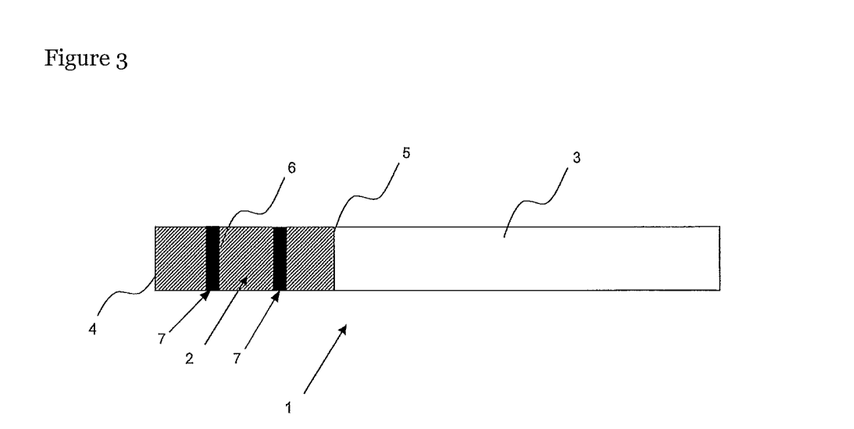
FIG. 3 is a schematic side view of a smoking article including a filter according to some embodiments.

Referring to FIGS. 2 and 3, a smoking article 1 according to embodiments of the invention are shown. The smoking article 1 of FIG. 2 contains one disc 7 comprising fine fibres, which is positioned centrally in the filter 2. The smoking article 1 of FIG. 3 contains two discs 7 comprising fine fibres, which are placed at approximately equal intervals along the filter 2. The two discs 7 are placed at the third and two third positions in the filter 2. The filter material 6 is as described herein.

In order to address various issues and advance the art, the entirety of this disclosure shows by way of illustration various embodiments in which the claimed invention(s) may be practiced and provide for superior filter materials. The advantages and features of the disclosure are of a representative sample of embodiments only, and are not exhaustive and/or exclusive. They are presented only to assist in understanding and teach the claimed features. It is to be understood that advantages, embodiments, examples, functions, features, structures, and/or other aspects of the disclosure are not to be considered limitations on the disclosure as defined by the claims or limitations on equivalents to the claims, and that other embodiments may be utilised and modifications may be made without departing from the scope and/or spirit of the disclosure. Various embodiments may suitably comprise, consist of, or consist essentially of, various combinations of the disclosed elements, components, features, parts, steps, means, etc. In addition, the disclosure includes other inventions not presently claimed, but which may be claimed in future.

Example 1

Non-woven webs of different densities, namely 5 gsm, 10 gsm and 15 gsm cellulose acetate fine fibres were produced by centrifuge spinning, using acetic acid and/or acetone as a solvent. The web was dried in a vacuum oven for a period of time suitable to remove residual solvent. The fine fibres were formed into discs and a disc was manually inserted into a cellulose acetate tow filter of a cigarette. The disc was positioned centrally in the filter, as illustrated in FIG. 2. The characteristics of the filters are provided in Table 1.

TABLE 1

| Filter material | Weight of fine fibres (mg)* | Median fine fibre diameter (μm) | % by weight fine fibres | Pressure drop (mmWG) |
|---|---|---|---|---|
| Cellulose acetate tow (Bar 1 in FIG. 4) | 0 | 0 | 0 | 120 |
| Cellulose acetate tow + 5 gsm fine fibre web (Bar 2 in FIG. 4) | 0.23 | 1.3 | 0.22 | 124 |
| Cellulose acetate tow + 10 gsm fine fibre web (Bar 3 in FIG. 4) | 0.47 | 1.4 | 0.44 | 130 |
| Cellulose acetate tow + 15 gsm fine fibre web (Bar 4 in FIG. 4) | 0.70 | 1.3 | 0.66 | 135 |

*Calculated approximately based on the basis weight of the fine fibre CA web and the circumference of the cigarette filter control The cigarettes with these filter variants were smoked according to ISO smoking regime (35 ml puff volume with a 2 second duration at 60 second intervals) with the ventilation zone blocked and the filtration efficiency was measured in terms of the filtration of nicotine-free dry particulate matter (NFDPM), nicotine and water using the analytical procedure described in C. Liu et al., Food Chem. Toxicol., 2011, 49(9), 1904 and in P. Branton et al., Chemistry Central Journal (2011), 5, 15.

Figure 4:
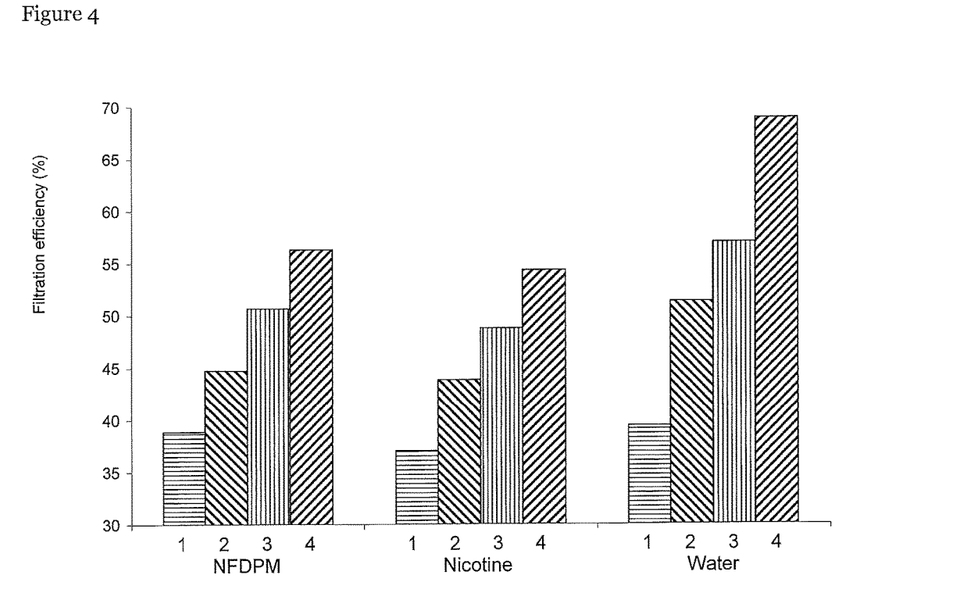
FIGS. 4, 6-10 are bar charts showing the filtration efficiency of filter materials described herein according to some embodiments.

The filtration efficiency of the filter materials is shown in FIG. 4. The filtration efficiency was calculated using the following equation, where FE is the filtration efficiency and SY is the smoke yield:

$$FE=100\times(SY_{no\,filter}-SY_{filter})/SY_{no\,filter}$$

The results obtained show that the filters containing fine fibres have a greater filtration efficiency than the control filters, while at the same time having an acceptable pressure drop. The filtration efficiency of the different analytes increases with the gsm of the fine fibre web used in the filter.

Figure 5:
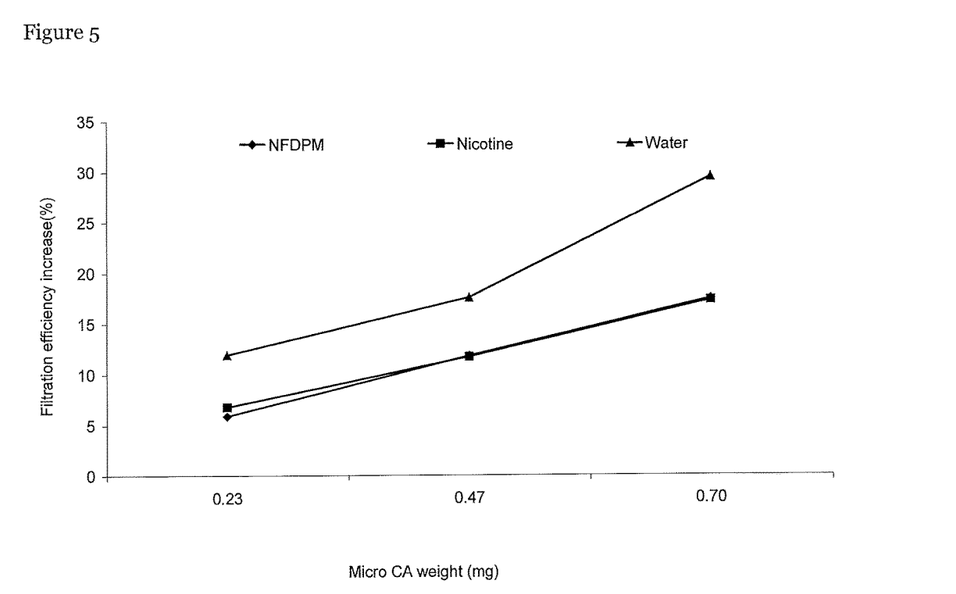
FIG. 5 is a graph showing how increasing the weight content of fine cellulose acetate fibres increases the filtration efficiency.

The filtration efficiency for NFDPM, nicotine and water of filters including cellulose acetate fine fibre web were then plotted against the weight of the fine cellulose acetate included and the results are shown in FIG. 5. The graph shows that the filtration efficiency increases as the weight of fine cellulose acetate fibre increases. Once again, the weight of fine fibres is approximated based on the basis weight of the fine fibre CA web and the circumference of the cigarette filter control.

Example 2

The experiment of Example 1 was carried out with fine fibre webs having different densities (gsm), namely 5 gsm and 15 gsm cellulose acetate fine fibres. In addition, the fine fibres used had a smaller diameter compared to the fine fibres used in Example 1. The characteristics of the filters are provided in Table 2.

TABLE 2

| Filter material | Median fine fibre diameter (μm) | Pressure drop (mmWG) |
|---|---|---|
| Cellulose acetate tow (Bar 1 in FIG. 6) | 0 | 119 |
| Cellulose acetate tow + 5 gsm fine fibre web (Bar 2 in FIG. 6) | 0.76 | 130 |
| Cellulose acetate tow + 15 gsm fine fibre web (Bar 3 in FIG. 6) | 0.76 | 158 |

The cigarettes with these filter variants were smoked according to ISO smoking regime with the ventilation zone blocked and the filtration efficiency was measured.

Figure 6:
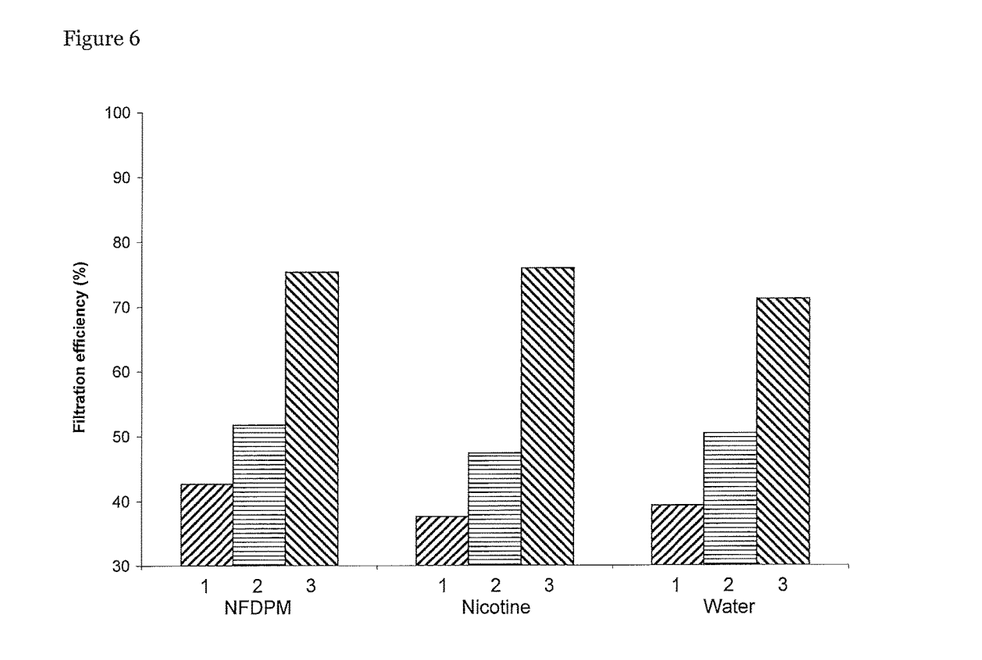

The filtration efficiency of the filter materials is shown in FIG. 6. The results obtained confirm that the filters containing fine fibres exhibit greater filtration efficiency than the control filters, while at the same time having an acceptable pressure drop. The filtration efficiency of the different analytes again increases with the gsm of the fine fibre web used in the filter. Furthermore, the results of Examples 1 and 2 indicate that the filtration efficiency is increased with a reduction in the diameter of the fine fibres.

Example 3

The experiment of Example 1 was then carried out with further fine fibre webs having different densities (gsm), namely 5 gsm, 7.5 gsm and 12.5 gsm and 15 gsm cellulose acetate fine fibres of smaller diameter than in Example 1. Once again, the cigarettes with these filter variants were smoked according to ISO smoking regime with the ventilation zone blocked.

Figure 7:
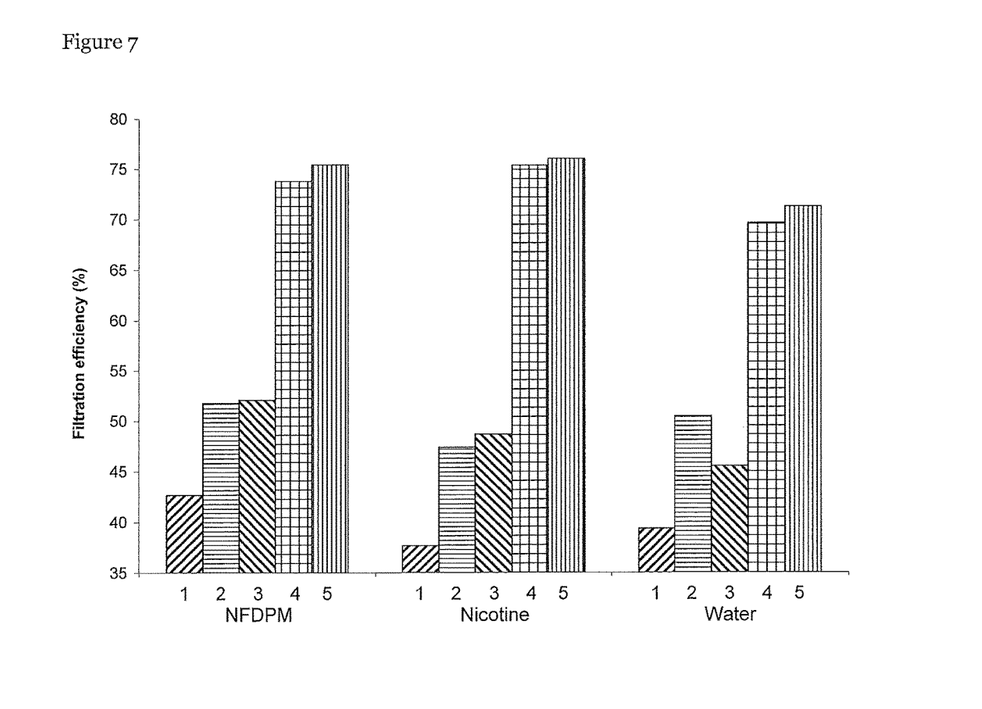

The filtration efficiency of the filter materials is shown in FIG. 7 and the characteristics of the filters were as follows:
Bar 1—Cellulose acetate tow (control)
Bar 2—Cellulose acetate tow+5 gsm fine cellulose acetate fibre web
Bar 3—Cellulose acetate tow+7.5 gsm fine cellulose acetate fibre web
Bar 4—Cellulose acetate tow+12.5 gsm fine cellulose acetate fibre web
Bar 5—Cellulose acetate tow+15 gsm fine cellulose acetate fibre web The results obtained confirm that the filters containing fine fibres have greater filtration efficiency than the control filters, and the filtration efficiency of the different analytes increases with the gsm of the fine fibre web used in the filter, even as the gsm increases to 15.

Example 4

A non-woven web of 7.6 gsm cellulose acetate fine fibres was produced as described in Example 1. The fine fibres were formed into discs. The discs were manually inserted into a cellulose acetate tow filter of a cigarette. When one disc was inserted, this was positioned centrally in the filter, as illustrated in FIG. 2. When two discs were inserted, these were positioned in the one third and two thirds positions in the filter, as illustrated in FIG. 3. The characteristics of the resulting filters are provided in Table 3.

TABLE 3

| Filter material | Weight of fine fibres (mg)* | Median fine fibre diameter (μm) | % by weight fine fibres | Pressure drop (mmWG) |
|---|---|---|---|---|
| Cellulose acetate tow (Bar 1 in FIG. 8) | 0 | 0 | 0 | 120 |
| Cellulose acetate tow + 7.6 gsm fine fibre web (Bar 2 in FIG. 8) | 0.36 | 1.0 | 0.34 | 127 |
| Cellulose acetate tow + 2 × 7.6 gsm fine fibre web (Bar 3 in FIG. 8) | 0.71 | 1.0 | 0.67 | 133 |

*Calculated approximately based on the basis weight of the fine fibre CA web and the circumference of the cigarette filter control.

The cigarettes with these filter variants were smoked according to ISO smoking regime (35 ml puff volume with a 2 second duration at 60 second intervals) with the ventilation zone blocked and the filtration efficiency was measured in terms of the filtration of nicotine-free dry particulate matter (NFDPM), nicotine and water, using the analytic methods mentioned above in connection with Example 1.

Figure 8:
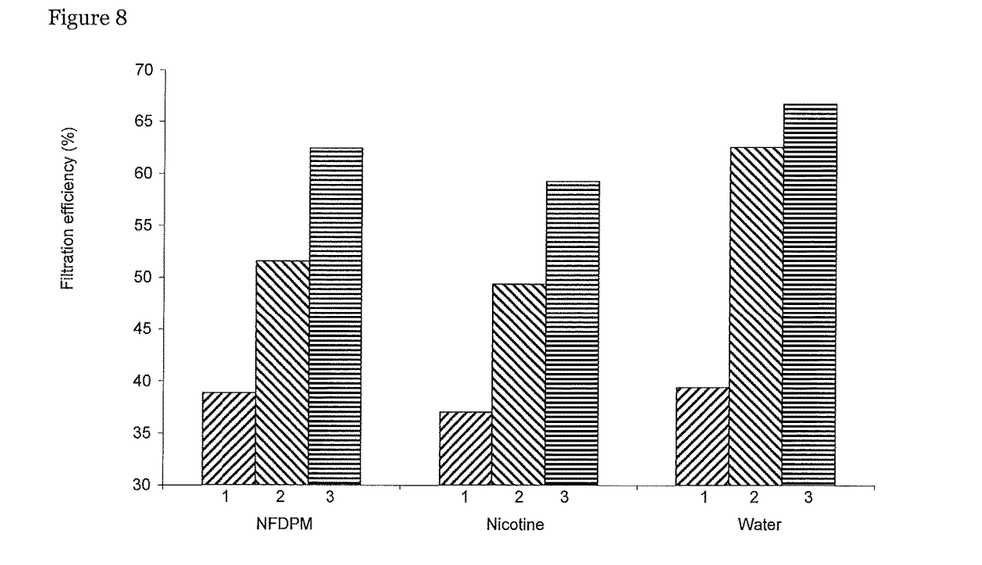

The results of the analyses are shown in FIG. 8. The results obtained show that the filters containing two discs of 7.6 gsm cellulose acetate fine fibre web have a greater filtration efficiency than the filters containing one disc of 7.6 gsm cellulose acetate fine fibre web, and that both types of disc-containing filters have a greater filtration efficiency than the control filters.

Example 5

The experiment of Example 4 was then repeated with filters including one or two discs of 7.5 gsm cellulose acetate fine fibre web, the fine fibres having a median diameter of 0.9 μm. A summary of the characteristics of the resulting filters is provided in Table 4.

TABLE 4

| Filter material | Pressure drop (mmWG) |
|---|---|
| Cellulose acetate tow (Bar 1 in FIG. 9) | 119 |
| Cellulose acetate tow + 7.5 gsm fine fibre web (Bar 2 in FIG. 9) | 136 |
| Cellulose acetate tow + 2 × 7.5 gsm fine fibre web (Bar 3 in Fig. 9) | 167 |

The cigarettes with these filter variants were smoked according to ISO smoking regime (35 ml puff volume with a 2 second duration at 60 second intervals) with the ventilation zone blocked and the filtration efficiency was measured in terms of the filtration of nicotine-free dry particulate matter (NFDPM), nicotine and water.

Figure 9:
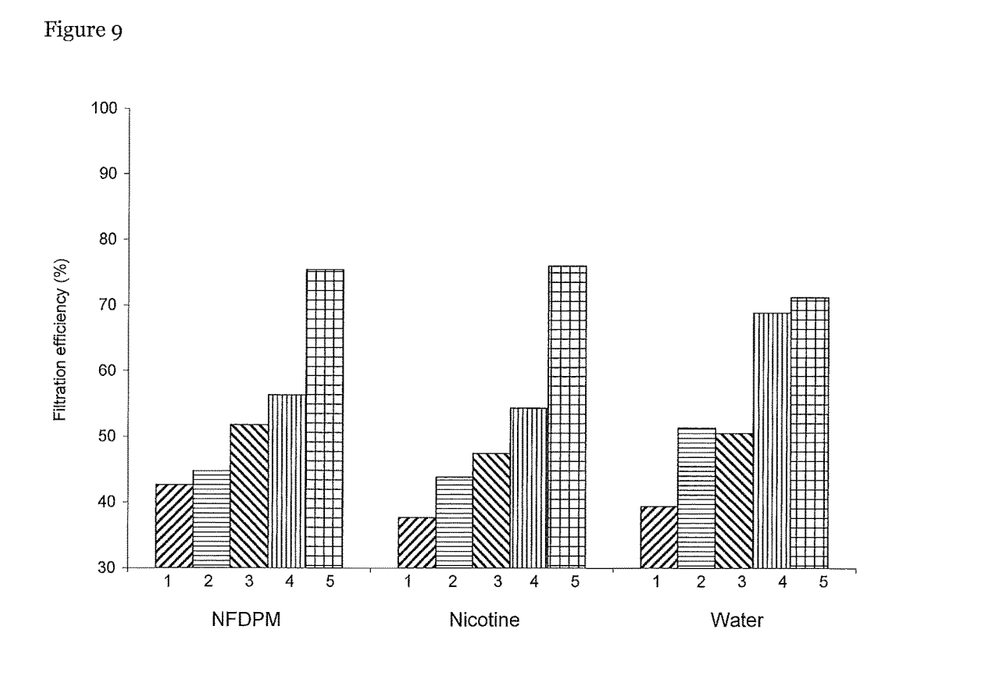

The results are shown in FIG. 9 and they confirm that the filters containing two discs (in this case of 7.5 gsm) of cellulose acetate fine fibre web have a greater filtration efficiency than the filters containing one disc, and that both types of disc-containing filters have a greater filtration efficiency than the control filters.

Example 6

The influence of the diameter of the fine fibre cellulose acetate was then investigated. Non-woven webs of 5 gsm and 15 gsm cellulose acetate fine fibres were produced as described in Example 1. The fine fibres were formed into discs and a disc was manually inserted into a cellulose acetate tow filter of a cigarette. The disc was positioned centrally in the filter, as illustrated in FIG. 2. The characteristics of the filters are provided in Table 5.

TABLE 5

| Filter material | Median fine fibre diameter (μm) | Pressure drop (mmWG) |
|---|---|---|
| Cellulose acetate tow (Bar 1 in FIG. 10) | 0 | 119 |
| Cellulose acetate tow + 5 gsm fine fibre web (Bar 2 in FIG. 10) | 1.3 | 124 |
| Cellulose acetate tow + 5 gsm fine fibre web (Bar 3 in FIG. 10) | 0.76 | 130 |
| Cellulose acetate tow + 15 gsm fine fibre web (Bar 4 in FIG. 10) | 1.3 | 135 |
| Cellulose acetate tow + 15 gsm fine fibre web (Bar 5 in FIG. 10) | 0.76 | 158 |

The cigarettes with these filter variants were smoked according to ISO smoking regime (35 ml puff volume with a 2 second duration at 60 second intervals) with the ventilation zone blocked and the filtration efficiency was measured in terms of the filtration of nicotine-free dry particulate matter (NFDPM), nicotine and water.

Figure 10:
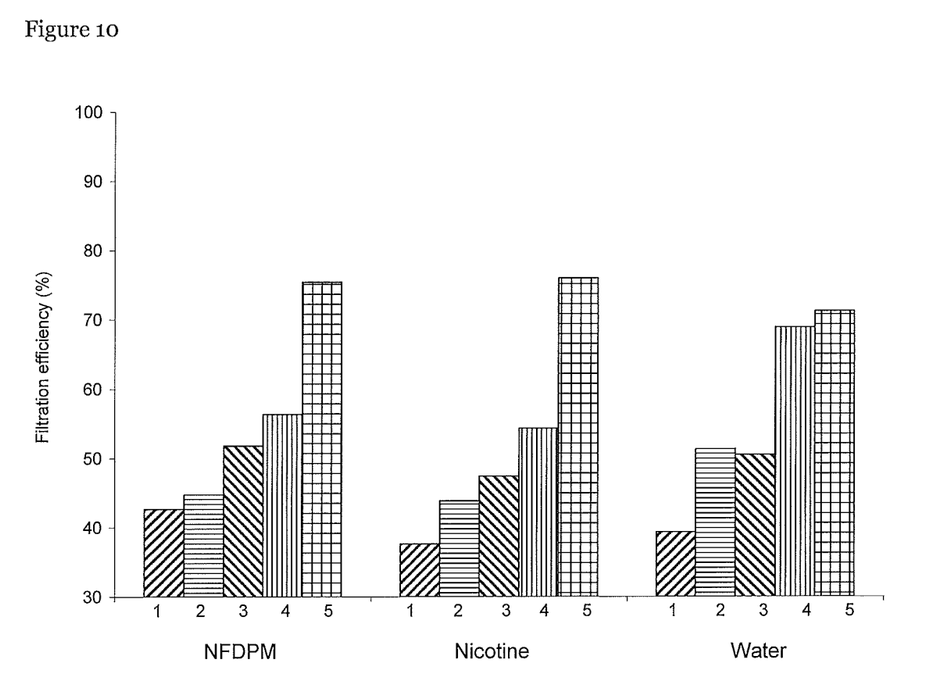

The results are shown in Figure to and they demonstrate that the higher density fine fibre combined with the finer of the examined fibre diameters produced the highest filtration efficiency. This correlation was very clear for NFDPM and nicotine, but was less pronounced for water. Indeed, for water the combination of lower density (5 gsm) and larger diameter (1.3 μm) exhibited better filtration than the lower density (5 gsm) and smaller diameter (0.76 μm). Otherwise, the smaller fine fibre diameter produced better filtration results.

Example 7

In the previous experiments, the discs of non-woven fine fibre web were positioned perpendicular to the smoke flow (as shown in FIGS. 2 and 3). To determine the influence of the position of the web, in this experiment, the hand-made cigarettes of the following filter variants were made:
 conventional CA tow as a control
 a disc of fine fibre CA web inserted in the middle of a CA tow filter
 a disc of CA tow inserted in the middle of a CA tow filter.

These cigarettes were smoked under the same conditions. Smoke yields are shown in and the calculated filtration efficiencies are given in Table 6. The results showed that the filtration efficiency for nicotine was 44.7 and 39.4% in the cigarettes with filters having a disc of fine fibre CA web and a disc of CA tow in the filter respectively in comparison to the control filter with 35.5% filtration efficiency. The same trend was obtained for the filtration efficiency of NFDPM for these cigarettes. These results illustrate the effect of the fibre diameter in the filter where adding 1.8 mg of fine fibres resulted in an increase of about 9% in the filtration efficiency of nicotine whereas adding 5.75 mg of regular fibres led to about 4% increase only. The increase in the pressure drop and the filtration efficiency was even more pronounced when a disc of fine fibre CA web was inserted into a paper filter. This could be related to the difference in the void volumes in the CA and paper filters. Inserting a disc of paper into the paper filter was not an easy manual operation and led to a relatively high pressure drop and so these cigarettes were not included in the smoke analyses tests.

The normalised phenol results showed that inserting a fine fibre CA web into the CA filters did not increase the retention of phenol. This suggests that the selectivity of CA for phenol retention does not depend on the CA fibre diameter. The paper filter results showed a significant decrease in the normalised phenol yield once a disc of fine fibre CA web was inserted into the filter but the yield was still relatively higher in comparison to the normalised yield in the cigarettes with the CA filter.

TABLE 6

| | CA tow Control | CA tow + disc of fine fibre CA | CA tow + disc of CA tow | paper filter | paper filter + disc of fine fibre CA | No filter |
|---|---|---|---|---|---|---|
| Filter Description | | | | | | |
| Plasticiser (Pz) | TA | TA | TA | None | None | — |
| Pz Amount (%) | 7.0 | 7.0 | 7.0 | 0.0 | 0.0 | — |
| Fine fibre CA/tow disc weight (mg) | 0.0 | 1.80 | 5.75 | 0.0 | 1.80 | — |

TABLE 6-continued

| | | CA tow Control | CA tow + disc of fine fibre CA | CA tow + disc of CA tow | paper filter | paper filter + disc of fine fibre CA | No filter |
|---|---|---|---|---|---|---|---|
| Cigarette (bound) PD (mmWG) | | 119 | 135 | 126 | 108 | 165 | 50 |
| Puff Number | | 8.1 | 8.1 | 7.9 | 7.9 | 7.9 | 8.0 |
| Analyte | Unit | | | | | | |
| CO | mg/cig | 12.7 | 12.5 | 13.2 | 12.6 | 12.5 | 12.1 |
| Nicotine | mg/cig | 0.92 | 0.79 | 0.87 | 0.62 | 0.35 | 1.43 |
| Water | mg/cig | 2.7 | 2.77 | 2.51 | 1.47 | 0.80 | 5.43 |
| NFDPM | mg/cig | 13.9 | 12.1 | 13.4 | 9.34 | 5.86 | 22.2 |
| TPM | mg/cig | 17.6 | 15.7 | 16.7 | 11.4 | 7.01 | 29.1 |
| Catechol | µg/cig | 60.8 | 55.0 | 61.4 | 46.4 | 24.9 | 110 |
| Hydroquinone | µg/cig | 57.6 | 53.7 | 61.4 | 40.8 | 20.4 | 103 |
| m-Cresol | µg/cig | 3.62 | 3.31 | 3.64 | 4.44 | 2.17 | 11.4 |
| o-Cresol | µg/cig | 4.77 | 4.26 | 4.73 | 6.19 | 2.92 | 16.2 |
| p-Cresol | µg/cig | 10.1 | 9.10 | 9.97 | 12.4 | 6.15 | 32.0 |
| Phenol | µg/cig | 19.8 | 17.5 | 20.1 | 30.3 | 14.4 | 83.5 |
| Resorcinol | µg/cig | NQ | NQ | NQ | NQ | NQ | 2.4 |
| Filtration efficiency (%) | | | | | | | |
| NFDPM | | 37.3 | 45.3 | 39.8 | 57.9 | 73.6 | |
| Nicotine | | 35.5 | 44.7 | 39.4 | 56.6 | 75.5 | |
| Water | | 49.9 | 49.0 | 53.8 | 72.9 | 85.3 | |
| Catechol | | 44.9 | 50.1 | 44.3 | 57.9 | 77.4 | |
| Hydroquinone | | 44.2 | 48.0 | 40.6 | 60.5 | 80.2 | |
| m-Cresol | | 68.2 | 71.0 | 68.1 | 61.0 | 80.9 | |
| o-Cresol | | 70.7 | 73.8 | 70.9 | 61.9 | 82.0 | |
| p-Cresol | | 68.5 | 71.6 | 68.8 | 61.1 | 80.8 | |
| Phenol | | 76.2 | 79.1 | 75.9 | 63.6 | 82.7 | |
| Normalised yield (µg/mg NFDPM) | | | | | | | |
| Catechol | | 4.4 | 4.5 | 4.6 | 5.0 | 4.2 | 5.0 |
| Hydroquinone | | 4.1 | 4.4 | 4.6 | 4.4 | 3.5 | 4.7 |
| m-Cresol | | 0.3 | 0.3 | 0.3 | 0.5 | 0.4 | 0.5 |
| o-Cresol | | 0.3 | 0.4 | 0.4 | 0.7 | 0.5 | 0.7 |
| p-Cresol | | 0.7 | 0.8 | 0.7 | 1.3 | 1.0 | 1.4 |
| Phenol | | 1.4 | 1.4 | 1.5 | 3.2 | 2.5 | 3.8 |

Example 8

The effect of the fine CA fibres in the cigarette filters was also investigated using machine-made filters including a fine fibre CA web deposited on paper as a carrier.

Three samples of different fine fibre CA web basis weights were used, namely 3, 6 and 9 gsm, all with a fibre diameter of 1.3 µm. Filter rods were made from these samples and the manufactured filter rods had the characteristics set out in Table 7. Due to the limited supply of the fine fibre CA web deposited on paper, it was not possible to manufacture filter rods with similar pressure drops. Because of the difference in the pressure drops of the test sample filter rods controls of different pressure drops were manufactured to match the pressure drop of the test samples.

From the filter rods characteristics (Table 7) it can be seen that the weight of the filter rods made with the fine fibre CA web/paper is lower than that of the controls made from just paper at similar pressure drops. Additionally, increasing the basis weight of the fine fibre CA web resulted in a need to decrease the web width to make the filter rods with a similar pressure drop.

TABLE 7

| Filter | Web width (mm) | Fine fibre CA basis weight (gsm) | Fine fibre CA web/paper (%) | Filter rod weight (mg) | Filter rod circumference (mm) | Filter rod (bound) PD (mmWG) |
|---|---|---|---|---|---|---|
| CA 3 gsm | 206 | 3 | 9/91 | 1171 | 24.5 | 499 |
| CA 6 gsm | 195 | 6 | 17/83 | 1168 | 24.4 | 404 |
| CA 9 gsm | 188 | 9 | 26/74 | 1209 | 24.4 | 423 |
| Paper (1) | 256 | — | 0/100 | 1282 | 24.5 | 343 |
| Paper (3) | 272 | — | 0/100 | 1396 | 24.5 | 455 |
| Paper (4) | 280 | — | 0/100 | 1429 | 24.4 | 564 |
| Paper (6) | 266 | — | 0/100 | 1360 | 24.4 | 427 |

The smoke chemistry analyses of the manufactured cigarettes were carried out under the ISO smoking regime with the ventilation zone blocked and the results are provided in Tables 8 and 9.

TABLE 8

| Filter | CA 3 gsm | CA 6 gsm | CA 9 gsm |
|---|---|---|---|
| Web width (mm) | 206 | 195 | 188 |
| Fine fibre CA basis weight (gsm) | 3 | 6 | 9 |
| Fine fibre CA web/paper | 9/91 | 17/83 | 26/74 |

TABLE 8-continued

| composition (%) | | | |
|---|---|---|---|
| Plasticiser | None | None | None |
| Plasticiser Loading (%) | 0.0 | 0.0 | 0.0 |
| Filter Weight (g) | 0.22 | 0.26 | 0.23 |
| Bound filter PD (mmWG) | 92 | 109 | 100 |

| Analyte | Unit | | | |
|---|---|---|---|---|
| CO | mg/cig | 13.7 | 13.7 | 12.9 |
| NFDPM | mg/cig | 8.54 | 5.44 | 5.27 |
| Nicotine | mg/cig | 0.50 | 0.30 | 0.30 |
| Water | mg/cig | 1.77 | 0.79 | 0.73 |
| TPM | mg/cig | | | |
| Catechol | µg/cig | 32.0 | 21.2 | 16.8 |
| Hydroquinone | µg/cig | 28.2 | 17.5 | 15.4 |
| m-Cresol | µg/cig | 2.67 | 1.76 | 1.27 |
| o-Cresol | µg/cig | 3.68 | 2.06 | 1.66 |
| p-Cresol | µg/cig | 7.58 | 5.26 | 3.59 |
| Phenol | µg/cig | 17.7 | 10.5 | 7.79 |
| Resorcinol | µg/cig | NQ | NQ | NQ |
| Filtration efficiency (%) | | | | |
| NFDPM | | 64.7 | 77.5 | 78.2 |
| Nicotine | | 69.4 | 81.7 | 81.5 |
| Water | | 72.6 | 87.7 | 88.8 |
| Catechol | | 67.0 | 78.1 | 82.7 |
| Hydroquinone | | 66.1 | 78.9 | 81.5 |
| m-Cresol | | 73.2 | 82.3 | 87.3 |
| o-Cresol | | 73.9 | 85.4 | 88.2 |
| p-Cresol | | 72.7 | 81.0 | 87.1 |
| Phenol | | 75.8 | 85.7 | 89.4 |
| Normalised yield (µg/mg NFDPM) | | | | |
| Catechol | | 3.75 | 3.90 | 3.19 |
| Hydroquinone | | 3.30 | 3.22 | 2.92 |
| m-Cresol | | 0.31 | 0.32 | 0.24 |
| o-Cresol | | 0.43 | 0.38 | 0.31 |
| p-Cresol | | 0.89 | 0.97 | 0.68 |
| Phenol | | 2.07 | 1.93 | 1.48 |

The smoke yields and the calculated filtration efficiencies for NFDPM, nicotine and phenolic compounds of the cigarettes with fine fibre CA/paper filters provided in Table 8 show that at similar filter weight and pressure drop the filtration efficiency increases with increasing the content of the fine fibre CA in the filter.

The comparison of the filtration efficiency of the cigarettes with fine fibre CA/paper filters and the control (paper) filter at similar pressure drops shows that increasing the content of fine fibre CA increases the filtration efficiency (Tables 8 and 9). This was also seen in the case of the hand-made cigarettes reported in the previous Examples.

The normalised phenol results in Table 8 show that increasing the weight of the fine fibre CA in the filter results in the decrease of the normalised phenol yields.

TABLE 9

| | | P1 | P3 | P4 | P6 | CA Control | No Filter |
|---|---|---|---|---|---|---|---|
| Filter | | | | | | | |
| Paper width (mm) | | 256 | 272 | 280 | 266 | — | — |
| Plasticiser | | None | None | None | None | TA | — |
| Plasticiser Loading (%) | | 0.0 | 0.0 | 0.0 | 0.0 | 10.1 | — |
| Filter Weight (g) | | 0.24 | 0.26 | 0.26 | 0.25 | 0.16 | — |
| Bound filter PD (mmWG) | | 70 | 87 | no | 80 | 74 | — |
| Analyte | Unit | | | | | | |
| CO | mg/cig | 13.1 | 13.7 | 12.6 | 12.6 | 13.3 | 13.2 |
| NFDPM | mg/cig | 9.69 | 9.47 | 7.55 | 9.14 | 14.3 | 24.2 |
| Nicotine | mg/cig | 0.59 | 0.57 | 0.46 | 0.56 | 0.99 | 1.64 |
| Water | mg/cig | 1.61 | 1.61 | 0.97 | 1.43 | 3.01 | 6.46 |
| TPM | mg/cig | | | | | | |
| Catechol | µg/cig | 43.9 | 34.8 | 34.9 | 36.6 | 53.3 | 97.0 |
| Hydroquinone | µg/cig | 37.6 | 30.9 | 31.0 | 32.8 | 51.0 | 83.0 |
| m-Cresol | µg/cig | 4.17 | 3.14 | 3.19 | 3.47 | 3.08 | 9.96 |
| o-Cresol | µg/cig | 5.18 | 4.44 | 4.41 | 4.85 | 3.99 | 14.1 |
| p-Cresol | µg/cig | 12.4 | 8.75 | 8.85 | 9.41 | 8.52 | 27.8 |
| Phenol | µg/cig | 27.2 | 21.5 | 21.4 | 22.9 | 16.8 | 73.1 |
| Resorcinol | µg/cig | NQ | NQ | NQ | NQ | NQ | 2.13 |
| Filtration efficiency (%) | | | | | | | |
| NFDPM | | 60.0 | 60.9 | 68.8 | 62.2 | 40.9 | |
| Nicotine | | 63.8 | 65.2 | 72.1 | 65.9 | 39.7 | |
| Water | | 75.1 | 75.1 | 85.0 | 77.9 | 53.4 | |
| Catechol | | 54.8 | 64.2 | 64.0 | 62.3 | 45.1 | |
| Hydroquinone | | 54.7 | 62.7 | 62.6 | 60.4 | 38.6 | |
| m-Cresol | | 58.1 | 68.5 | 68.0 | 65.2 | 69.0 | |
| o-Cresol | | 63.3 | 68.5 | 68.7 | 65.6 | 71.7 | |
| p-Cresol | | 55.4 | 68.5 | 68.1 | 66.1 | 69.3 | |
| Phenol | | 62.8 | 70.6 | 70.7 | 68.7 | 77.0 | |
| Normalised yield (µg/mg NFDPM) | | | | | | | |
| Catechol | | 4.53 | 3.67 | 4.62 | 4.00 | 3.73 | 4.01 |
| Hydroquinone | | 3.88 | 3.26 | 4.11 | 3.59 | 3.57 | 3.43 |
| m-Cresol | | 0.43 | 0.33 | 0.42 | 0.38 | 0.22 | 0.41 |

TABLE 9-continued

|  | P1 | P3 | P4 | P6 | CA Control | No Filter |
|---|---|---|---|---|---|---|
| o-Cresol | 0.53 | 0.47 | 0.58 | 0.53 | 0.28 | 0.58 |
| p-Cresol | 1.28 | 0.92 | 1.17 | 1.03 | 0.60 | 1.15 |
| Phenol | 2.81 | 2.27 | 2.83 | 2.51 | 1.17 | 3.02 |

The results showed that, in comparison to the paper control filter, the fine fibre CA web/paper filter resulted in a reduced filter weight at a similar pressure drop, increased filtration efficiency at a similar pressure drop and increased filtration selectivity for phenol.

The results obtained from combining fine fibre cellulose acetate with paper indicate that this type of filter material can be considered as an alternative to conventional cellulose acetate tow, providing comparable filtration characteristic but enhanced degradability. Such paper-based filter materials would be expected to show significantly increased degradability in comparison with conventional filter material.

The invention claimed is:

1. A filter material for inclusion in a smoking article, wherein the filter material comprises a base material comprising fibers having a first diameter or mean diameter, and fine fibers on a surface of the base material and having a diameter or mean diameter which is smaller than the first diameter and which is between 5 μm and 10 μm, wherein the filter material comprises more than 10% by weight and/or by volume fine fibers and wherein the fine fibers comprise cellulose acetate.

2. A filter material for inclusion in a smoking article, wherein the filter material consists of fine fibers having a diameter or mean diameter of between 5 μm and 10 μm and wherein the fine fibers comprise cellulose acetate.

3. A filter material according to claim 2, wherein the fine fibers have a diameter or mean diameter of 5 μm, or wherein the diameter or mean diameter of the fine fibers is between 5 μm and about 7 μm, or wherein the fine fibers have a diameter or mean diameter of between about 7 μm and 10 μm.

4. A filter material according to claim 1, wherein the fine fibers comprise cellulose acetate and at least one selected from the group consisting of: polylactic acid (PLA), polybutylene succinate (PBS), polyvinyl alcohol (PVOH), polybutylene adipate terephthalate (PBAT), polyglycolic acid (PGA), chitosan, polyhydroxybutyrate (PHB), polyethylene oxide (PEO) and gelatine.

5. A filter material according to claim 1, wherein the fine fibers consist essentially of cellulose acetate.

6. A method of preparing a filter material according to claim 1, wherein the fine fibers are produced by a process selected from the group consisting of: centrifuge spinning and dry spinning.

7. A filter material according to claim 1, wherein the base material consists essentially of a biodegradable material.

8. A filter material according to claim 1, wherein the base material comprises polylactic acid, polyvinyl alcohol, cellulose, cellulose acetate, or any combination thereof.

9. A filter material according to claim 1, wherein the base material comprises cellulose acetate.

10. A filter material according to claim 1, wherein the base material is in the form of tow, or wherein the base material is in the form of a non-woven web.

11. A filter, which comprises the filter material of claim 1.

12. A smoking article, which comprises the filter of claim 11.

13. A filter material according to claim 1, wherein the base material consists essentially of cellulose acetate.

14. A filter element, which comprises the filter material of claim 1.

* * * * *